United States Patent [19]

Reid

[11] 4,107,383
[45] Aug. 15, 1978

[54] ELECTRIC CABLE INSULATING COMPOSITIONS CONTAINING COCONUT SHELL FLOUR FILLER

[76] Inventor: Brian C. Reid, 3 Pump Ct., London Temple, E.C. 4, England

[21] Appl. No.: 768,043

[22] Filed: Feb. 14, 1977

[51] Int. Cl.² .......................... B44D 1/42; C08L 1/00
[52] U.S. Cl. .............................. 428/379; 174/110 SR; 174/110 V; 260/17.4 R
[58] Field of Search .............. 260/17.4 R; 174/110 R, 174/110 B, 110 V, 110 SR, 110 SY

[56] References Cited

U.S. PATENT DOCUMENTS

| | | | |
|---|---|---|---|
| 2,394,550 | 2/1946 | Jensen | 260/17.4 R |
| 3,110,696 | 11/1963 | Dexter | 260/45.8 NT |
| 3,878,143 | 4/1975 | Baumann et al. | 260/17.4 R |
| 3,962,531 | 6/1976 | Lever et al. | 174/110 SR |
| 3,988,270 | 10/1976 | Willis et al. | 260/17.4 R |

OTHER PUBLICATIONS

Electrical Manufacturing, Richardson et al., Apr. 1953, "Plastics Dielectric Properties."
Chem. Absts., vol. 72 (1970) 122482r, "Manufacture . . . Materials," Chao et al.
Chem. Absts., vol. 77 (1972) 6818j, "Adhesives for Wood," Schmidt-Hellerau.
Chem. Absts., vol. 77 (1972) 50432c, "Gluing . . . Effect . . . Additives," Jain et al.

Primary Examiner—Edward M. Woodberry
Attorney, Agent, or Firm—Flynn & Frishauf

[57] ABSTRACT

Coconut shell flour is used as a filler in insulating compositions containing coconut shell flour filler for electric cables.

6 Claims, No Drawings

ELECTRIC CABLE INSULATING COMPOSITIONS CONTAINING COCONUT SHELL FLOUR FILLER

This invention relates to electrical insulating compositions and to products, in particular electric cables, employing the same.

A wide range of polymeric materials are now known for use as electrical insulants, including natural rubber, styrene-butadiene copolymers, butadiene-acrylonitrile copolymers, polyvinyl chloride, polyethylene, polyamides, and silicone rubbers.

These materials are not generally employed alone, as electrical insulants. They are usually compounded with other ingredients before being applied to the electrical conductor or other component requiring to be insulated. These ingredients may include plasticizers, vulcanizers, accelerators, stablizers, anti-oxidants, colouring materials, waxes. There is a considerable body of knowledge available to those skilled in the art as regards precise formulations. These will depend upon, for example, the electrical characteristics and other physical characeristics, e.g. toughness, water-resistance, flexibility required and the nature of the starting polymer. Thus polyvinylchloride formulations do not require a vulcanizer, the polymer being a thermoplastic, whereas synthetic rubber formulations do. For a fuller description of this background knowledge reference may be made to pages 110-144 of "Kabel und Leitungen", published in 1961 by Veb Verlag Technik, Berlin, author J. Artbauer.

A compounding ingredient of considerable importance is the filler. Fillers are very widely used, both to reduce the cost of the insulating composition and, sometimes, to improve the characteristics of the insulating composition. Amongst the fillers commonly used there may be mentioned chalk, whiting, carbon black, silica, and talc. Care is necessary, however, in the precise selection of filler and its amount, since it may affect adversely some electrical or other physical characteristic e.g. moisture take-up of the insulating composition.

Thus, for GR-S insulation, whiting is extensively used, sometimes in the form of stearate-coated whiting. The stearate coating improves the reinforcing properties of the whiting but can lead to processing difficulties on account of the stickiness which it imparts. Clays, particularly calcined clays, are also used. For polyvinylchloride insulation, partially calcined clays and carbon black are commonly employed.

It has now been found that the finely ground shell of the fruit of the coconut tree (*cocos nucifera*) is of considerable value as a filler in synthetic polymeric insulating compositions for electric cables.

Thus the present invention provides in one aspect an electric cable insulating composition comprising a synthetic thermoplastic organic polymer and, as filler therefor, coconut shell flour.

In another aspect, the present invention provides an electric cable insulating composition comprising a synthetic rubber, in particular a styrene-butadiene copolymer, and, as filler therefor, coconut shell flour.

In another aspect, the present invention provides an electrical insulating composition comprising polyvinyl chloride and, as filler therefor, coconut shell flour.

The present invention also includes the eventual electric cable comprising an electric conductor jacketed by an insulating sheath of the new compositions described.

Coconut shell flour suitable for use in the present compositions may be made as follows:

Broken coconut shell (preferably after storage to reduce adhering pithy matter) is further broken up into pieces about one inch square by passing through a beater-type disintegrator. This broken material is then fed into a primary grinding mill. Suction in this conveying system draws up the particles into two cyclones of unequal size, erected in tandem above the roof of the building. The ultrafine particles which get drawn away from both cyclones to the exhaust end of the ducting (by air separation) are collected in linen bags fitted at this end. The residual material that is left behind then separates into particles of two sizes. As the larger particles drop into the basal bin of the smaller cyclone, the finer ones accumulate in the bin of the larger cyclone.

The larger particles collected in the first cyclone bin are fed through pipes into secondary grinders. The ground particles from the secondary grinders follow the same course and are subjected to the same air separation as the particles from the primary grinders.

The finer particles collected in the second cyclone bin are fed into vibratory sifters, fitted with fine phosphobronze mesh, where the oversize particles and fluff are separated from the fine particles. Fluff and foreign matter are removed from the sifter trays, and the oversize material remaining on the mesh is fed into the secondary grinders for regrinding.

The fine particles from the sifters are fed through worm conveyors into a further set of vibratory sifters which separate the 100-120 mesh shell flour. The sifter outlets fill the flour into suitable storage bags. The oversize particles from the bagging outlet sifters are fed into the secondary grinders for regrinding. The ultrafine particles (graded as 300 mesh) collecting in the linen bags are released every few hours into separate storage bags. I prefer to use the fine-particle flour for my electrical insulating compositions since the ultrafines may be awkward to handle on a large-scale in the preparation of the insulant mix, prior to application.

The proportion of coconut shell flour to polymeric insulant, that is, excluding all minor ingredients, is usually in the range of 5-30, preferably 8-20 parts by weight per 100 parts of polymeric insulant, although for certain applications up to 50 parts by weight may be tolerable.

Some examples of insulating compositions for an electric cable are as follows. In these examples, all parts are by weight.

EXAMPLE 1

Polyvinyl chloride: 100.0
Di-(2-ethylhexyl) phthalate: 55.0
Basic lead carbonate: 10.0
Paraffin wax: 9.5
Coconut shell flour: 10.0

EXAMPLE 2

Polyvinyl chloride: 100.0
Di-(2-ethylhexyl) phthalate: 50.0
Tribasic lead sulfate: 7.0
Paraffin wax: 1.0
Coconut shell flour: 12.0

EXAMPLE 3

Polyvinyl chloride: 100.0
Dioctyl phthalate: 45.0
Basic lead carbonate: 8.0
Calcium stearate: 0.5
Coconut shell flour: 10.0

The polyvinyl chloride used in these compositions should of course be of cable-grade.

EXAMPLE 4

Butadiene-styrene rubber copolymer (76.5 : 23.5 ratio of butadiene : styrene): 100.00
Zinc oxide: 3.00
Sulfur: 1.6
Mercaptobenzothiazole: 0.5
Diphenylguanidine: 0.6
Petroleum-based plasticizer: 6.0
Coconut shell flour: 20.00

EXAMPLE 5

Butadiene-acrylonitrile rubber copolymer (67 : 33 ratio of butadiene : acrylonitrile): 100.00
Zinc oxide: 5.00
Sulfur: 1.5
Benzothiazolyl disulfide: 1.5
Coumarone-indene resin: 10.0
Stearic acid: 1.0
Coconut shell flour: 30.0

The compositions of the above Examples may be extruded around the electric conductor or conductors, or otherwise applied thereto, by means of conventional machinery. In this connection, the lignin and furfural content of coconut shell particles contributes towards the flow properties of the composition during extrusion, and to the flexibility and smooth texture of the extruded insulating jacket. Suitable kinds of conventional extruders are described and illustrated at pages 406–413 of the previously cited "Kabel und Leitungen" book.

Other advantages of coconut shell flour include (i) the ready availability of coconut shells, coconuts being a food-crop produced widely in tropical regions for its meat and milk, (ii) the hardness of the shell particles compared to that of other organic fillers like wood flour, cellulose fibres and (iii) the improved water-resistance which can be obtained in the final insulant.

I claim:

1. An electric cable comprising a conductor and an insulating jacket of a composition containing a synthetic thermoplastic or rubbery organic polymeric insulating material and, as filler therefor, coconut shell flour, the proportion of coconut shell flour to insulating material being from 5 to 30 parts per 100 parts by weight.

2. An electric cable according to claim 1, wherein the insulating material is a thermoplastic organic polymer.

3. An electric cable according to claim 2, wherein the insulating material is a polyvinyl chloride.

4. An electric cable according to claim 2, wherein the insulating material is a synthetic rubber.

5. An electric cable according to claim 2, wherein the insulating material is a styrene-butadiene copolymer.

6. An electric cable according to claim 2, wherein the insulating material is a butadiene-acrylonitrile copolymer.

* * * * *

UNITED STATES PATENT AND TRADEMARK OFFICE
CERTIFICATE OF CORRECTION

PATENT NO. : 4,107,383
DATED : August 15, 1978
INVENTOR(S) : BRIAN C. REID

It is certified that error appears in the above-identified patent and that said Letters Patent are hereby corrected as shown below:

Title page, left column, after "[22] Filed: Feb. 14, 1977",
   insert the following paragraph:

---[30] Foreign Application Priority Data
   Feb. 24, 1976  United Kingdom......07136/1976---.

Signed and Sealed this

Eighth Day of January 1980

[SEAL]

Attest:

SIDNEY A. DIAMOND

Attesting Officer

Commissioner of Patents and Trademarks